United States Patent [19]

Raidel

[11] Patent Number: 4,722,549

[45] Date of Patent: Feb. 2, 1988

[54] SUSPENSION SYSTEM WITH UNIVERSAL PIVOT CONNECTION BETWEEN AXLE SEAT AND TORQUE ROD

[76] Inventor: John E. Raidel, Rte. 1, Box 400-M, Springfield, Mo. 65804

[21] Appl. No.: 11,249

[22] Filed: Feb. 5, 1987

[51] Int. Cl.⁴ .............................................. B60G 11/26
[52] U.S. Cl. .................................... 280/711; 280/688; 280/702
[58] Field of Search ............... 280/688, 686, 685, 687, 280/702, 711–718; 267/21 R, 18, 56

[56] References Cited

U.S. PATENT DOCUMENTS

| | | | |
|---|---|---|---|
| 3,510,149 | 5/1970 | Raidel | 280/712 |
| 4,445,707 | 5/1984 | Raidel | 280/711 |
| 4,541,653 | 9/1985 | Raidel | 280/711 |

*Primary Examiner*—Richard A. Bertsch

*Attorney, Agent, or Firm*—Rogers, Howell, Moore & Haferkamp

[57] ABSTRACT

A suspension system having a torque beam pivotally connected to a bushing supported by a hanger and an axle seat having a linear bushing mount to the torque beam to provide a universal pivot at the axle seat. In one embodiment there is another bushing between the torque rod and the axle seat so that the entire universal pivot is at the axle seat. In another embodiment, the universal pivot is provided partly by the torque rod connection to the hanger and partly by the connection between the axle seat and the torque rod. In two other embodiments, identical components allow installation of a suspension system to a tag axle or a steer axle except that a special tower is provided for the steer axle installation to give clearance between the vehicle frame and the wheel. Two additional embodiments have an overslung axle seat and in one, the torque beam and axle seat are outboard of the chassis.

26 Claims, 26 Drawing Figures

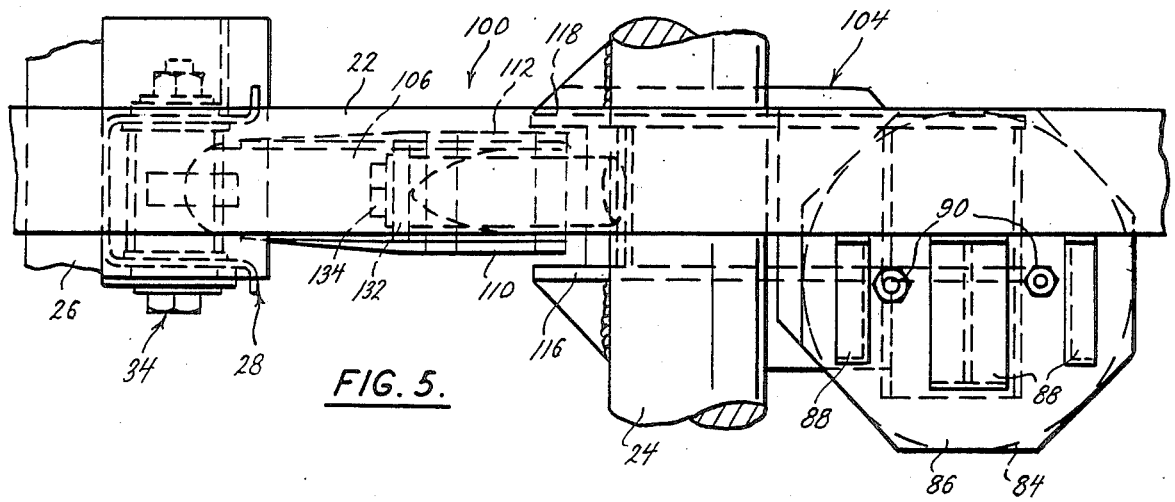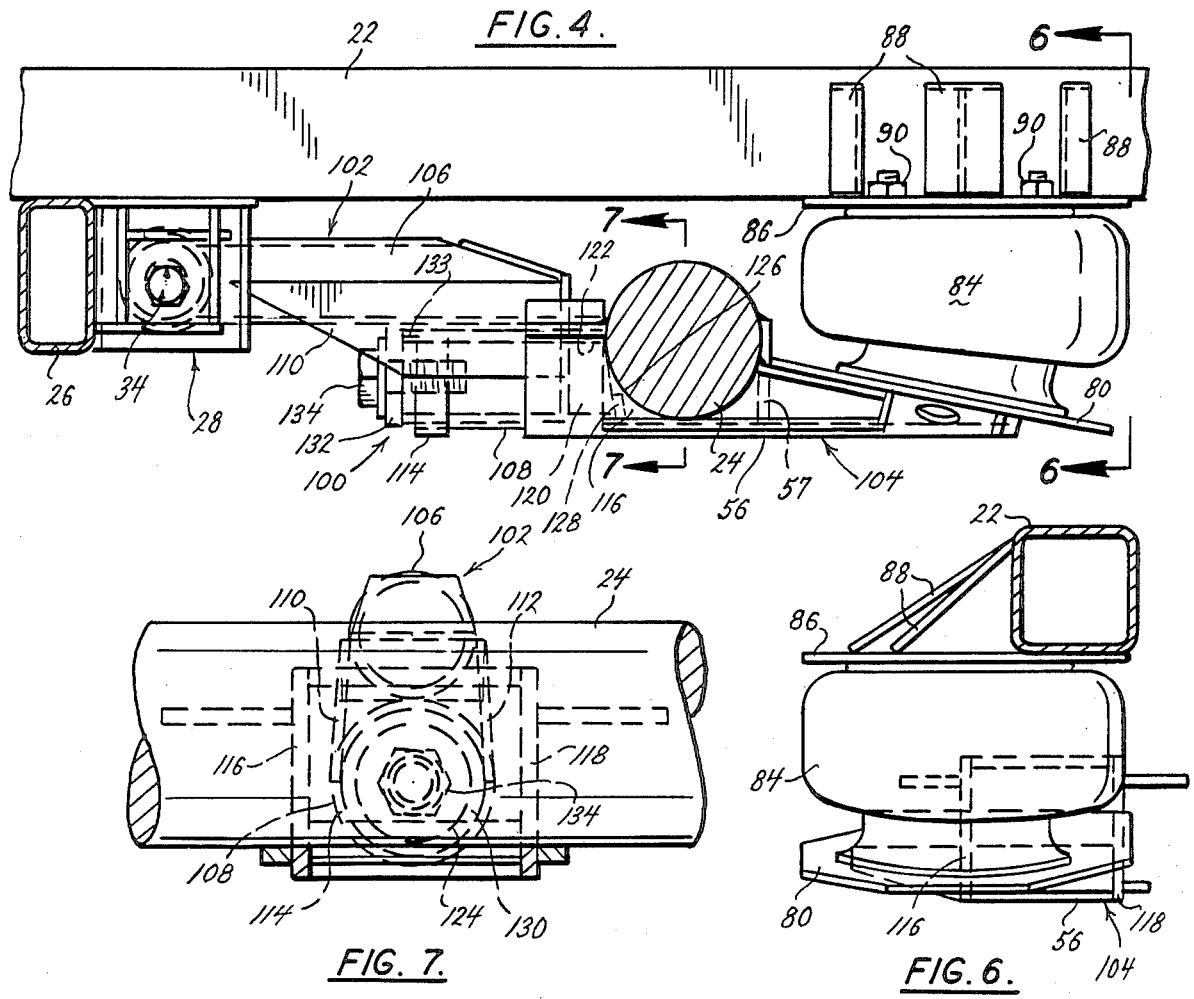

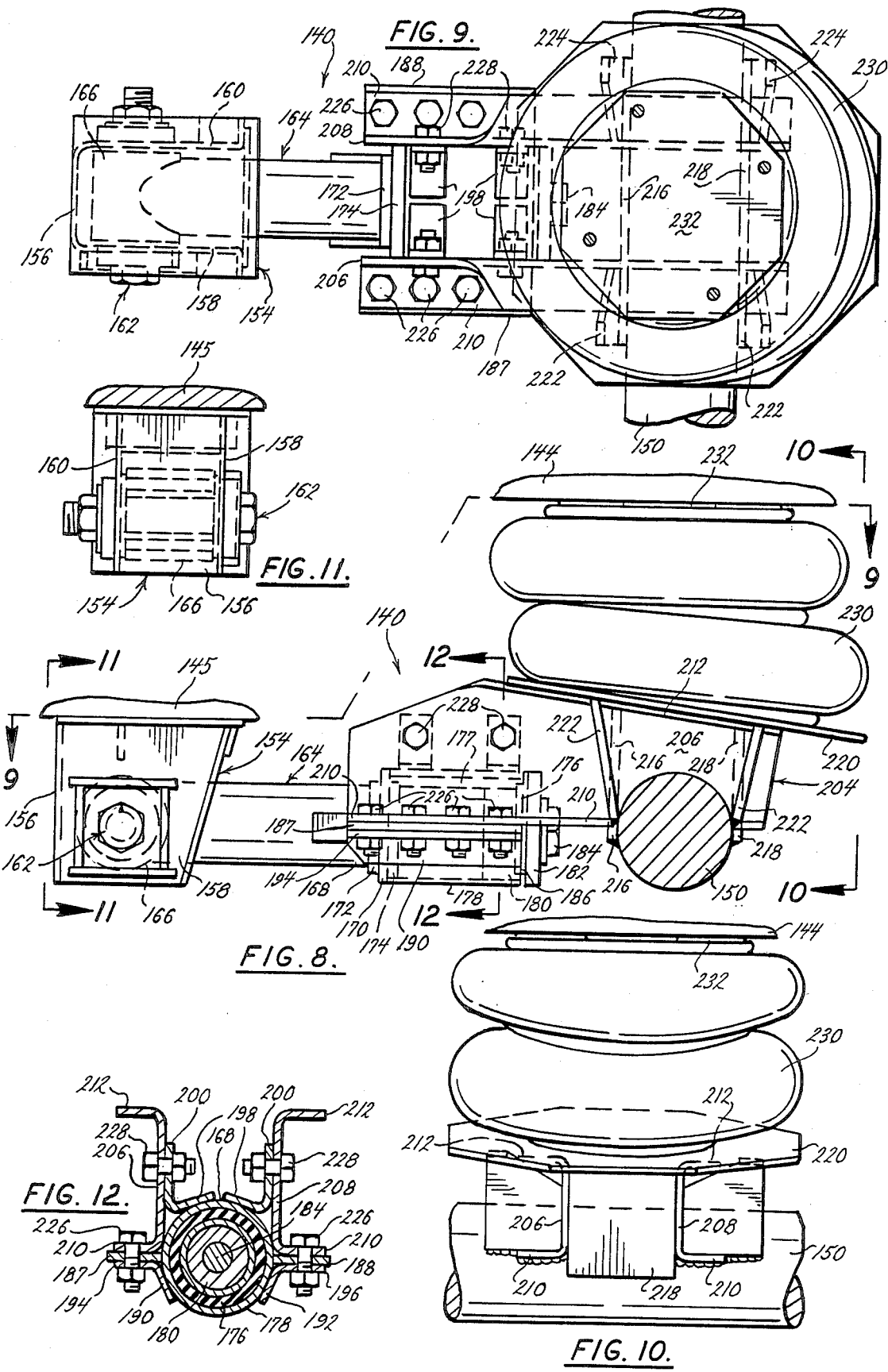

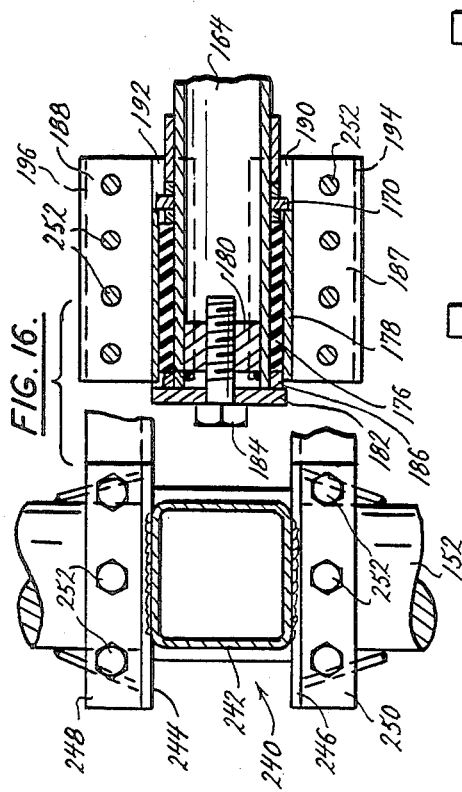
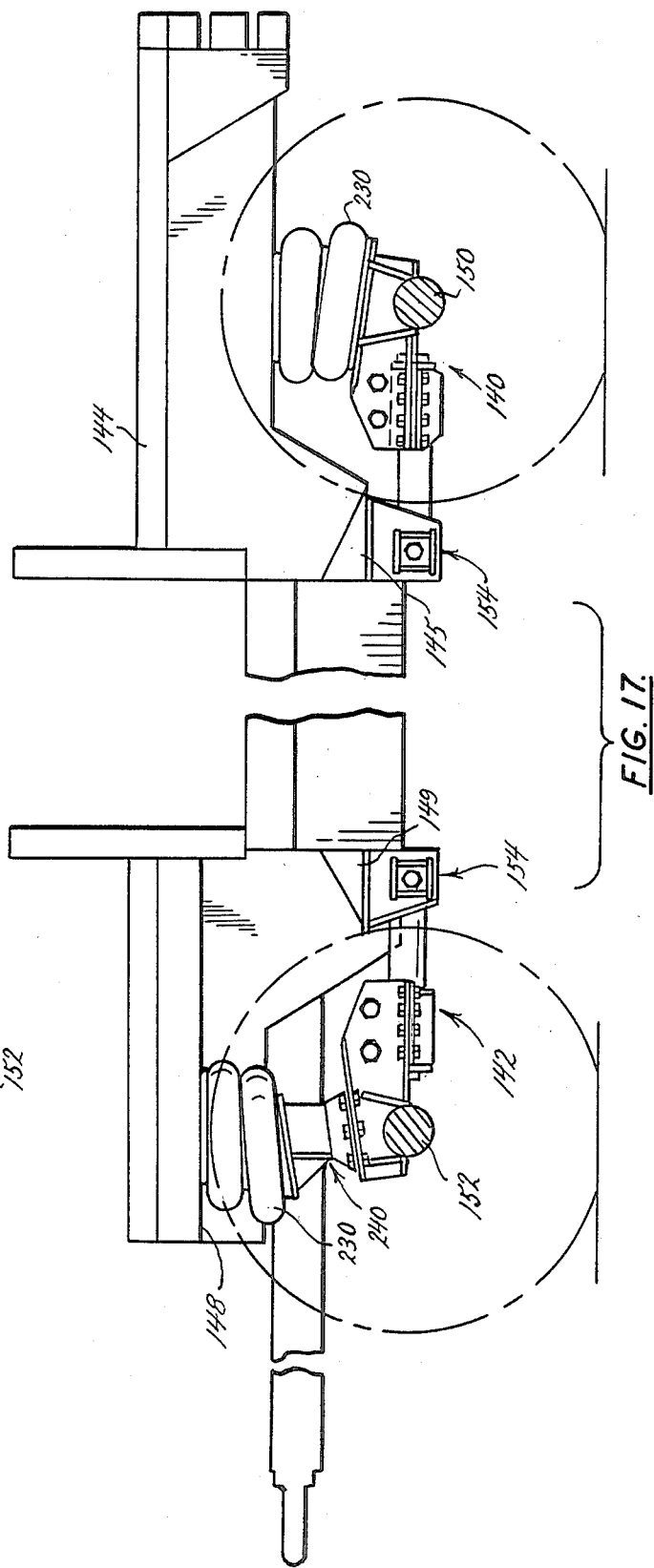

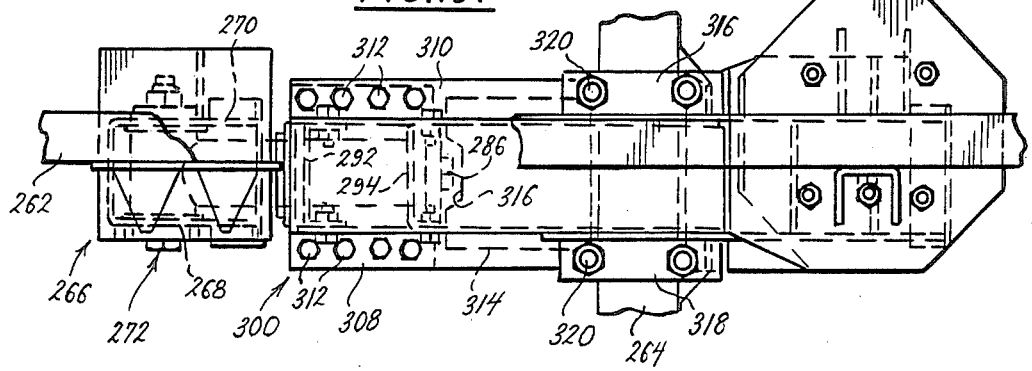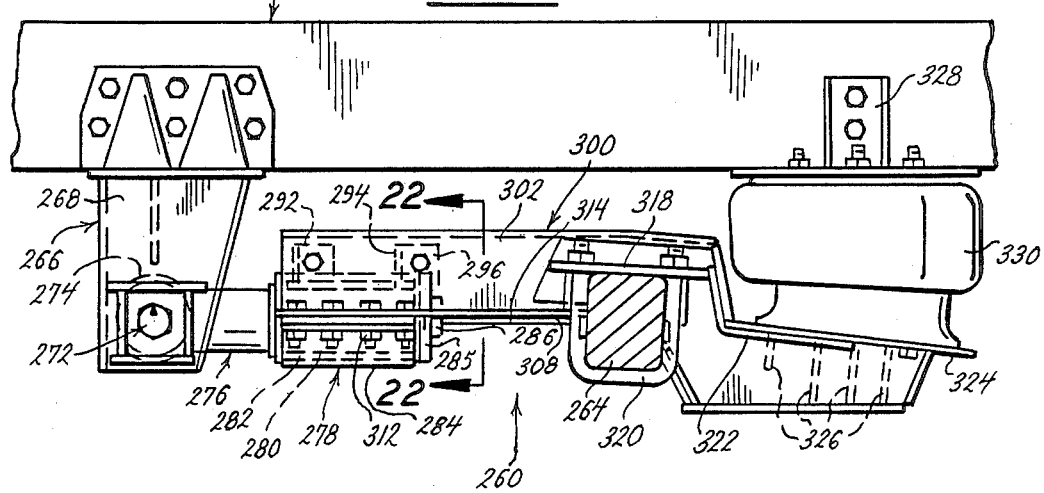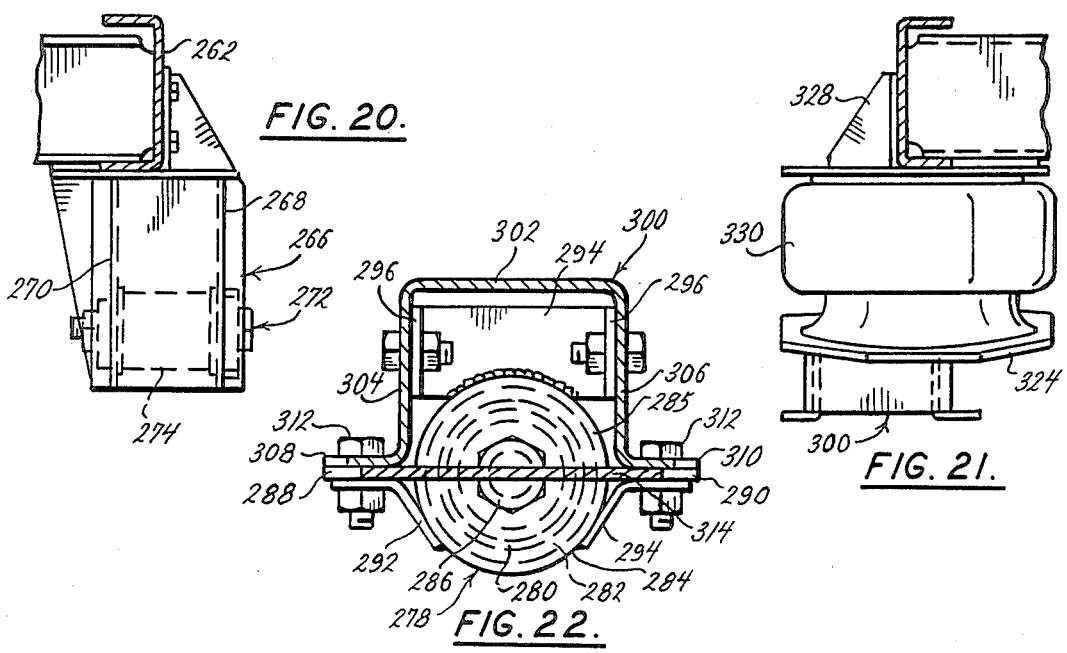

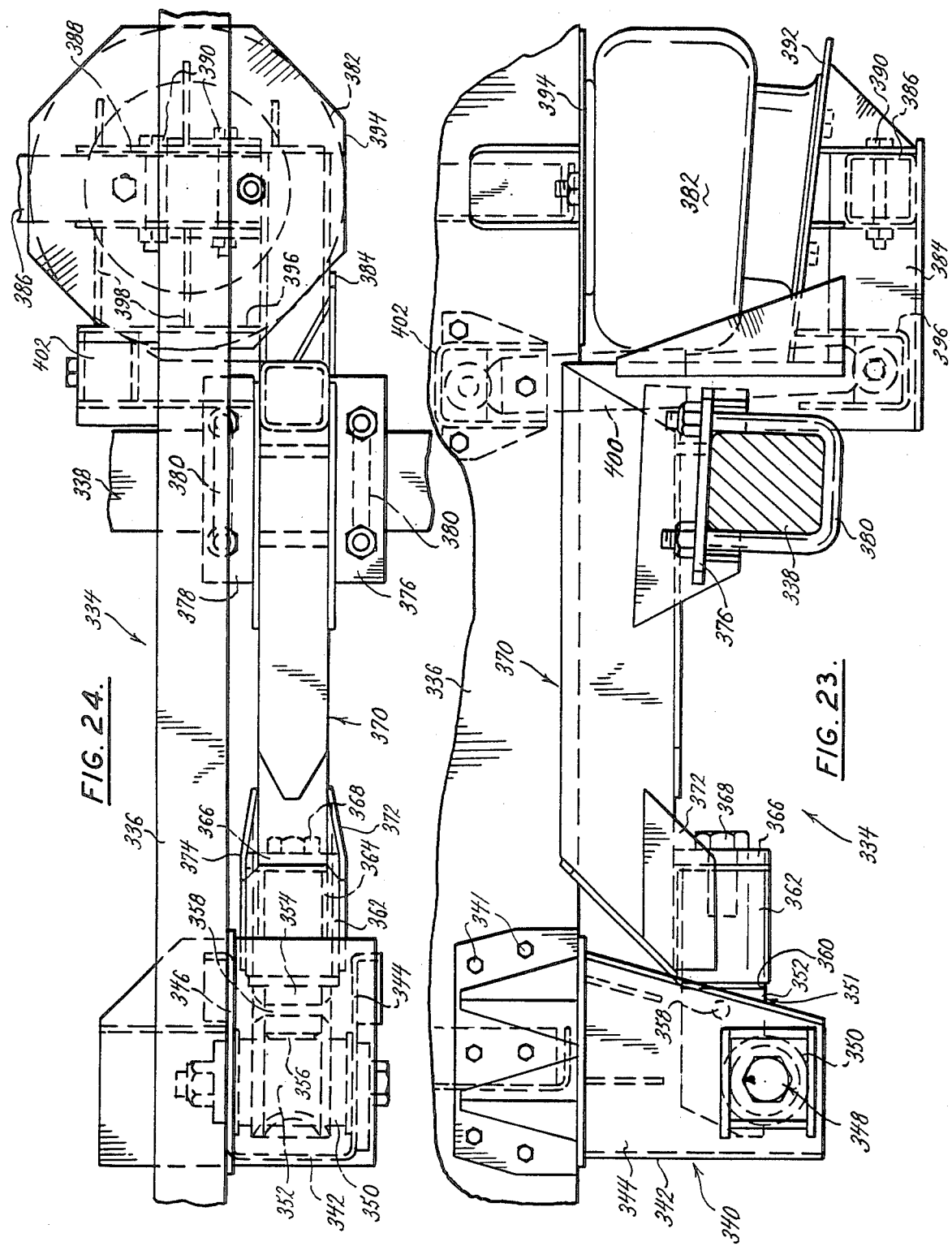

SUSPENSION SYSTEM WITH UNIVERSAL PIVOT CONNECTION BETWEEN AXLE SEAT AND TORQUE ROD

BACKGROUND AND SUMMARY OF THE INVENTION

This invention relates to a vehicle suspension system that has a universal pivot with a transverse pivot axis between a hanger and a torque rod and a longitudinal pivot axis provided between the torque rod and an axle seat.

A suspension system having a universal pivot arrangement is known as shown in U.S. Pat. No. 4,541,653 issued to John E. Raidel. However, a suspension system of the kind shown in that patent provides a universal pivot by connecting a longitudinal bushing and a transverse bushing both to a hanger and mounting the forward end of a torque beam to one of the bushings. The torque beam is also connected directly to an axle and to an air spring or is essentially integral with an axle seat that is connected to the axle and the air spring.

In the several embodiments of the present invention, there is only one bushing supported on a transverse axis by a hanger, and a torque rod is journalled on the bushing to allow swinging movement of the torque rod in a generally vertical plane. There is an axle seat that is independent of the torque rod and that is connected to an axle and to an air spring. The air spring is thus mounted between the axle seat and the chassis of the vehicle.

A bushing assembly oriented on a longitudinal axis provides the connection between the torque rod and the axle seat. This longitudinal bushing allows relative rotation between the axle seat and the torque rod about a longitudinal axis because the longitudinal bushing constitutes the only connection between those components. Thus, a bushing assembly that provides the connection between the axle seat and the torque rod also completes the universal pivotal movement to accommodate various motions of the axle relative to the chassis. In all of the embodiments, the torque beam is easily removable with only a wrench. This permits ready access to other vehicle components as well as easy bushing replacement.

The first two embodiments described are for installation on a car van trailer where vertical space is limited. In both of these embodiments, the axle seat is underslung relative to the axle and is generally below the torque rod.

In the first of these embodiments, the connection between the axle seat and the torque rod includes an additional bushing having an axis transverse to the vehicle that gives additional strength to the connection between the axle seat and the torque rod. The second embodiment incorporates a larger and stronger longitudinal bushing and allows the extra transverse bushing to be eliminated.

The third and fourth embodiments described are similar to one another in that both incorporate essentially the identical suspension components, except for a special tower. The third embodiment provides a suspension system for installation with a tag axle. The fourth embodiment utilizes the same components to provide a suspension system for installation with a steer axle. The difference between the two is the provision of a tower for the steer axle suspension. The tower is installed on the axle seat and the air spring is connected to the tower rather than directly to the axle seat. In this manner, the tower provides additional spacing of the steer axle from the frame so that the wheel carried on the steer axle will clear the frame when it turns and the brake chamber will clear the air spring. These third and fourth embodiments are particularly suitable for installation on a military vehicle.

The fifth embodiment described is heavier duty than the third and fourth embodiments. In the fifth embodiment, the axle seat is overslung relative to the axle and is generally above the torque rod, with a step down section where the air spring is connected. Special braces are provided for the connection between the torque rod and the housing of the longitudinal bushing. The suspension system of the fifth embodiment, like those of the first and second embodiments, can be installed on a vehicle having very limited vertical space available.

In a sixth embodiment, the axle seat is overslung and has a step down section where the air spring is mounted. Rather than by welding, the axle seat is connected to the axle by U-bolts. In addition, the bushing is mounted on the torque beam, and the axle seat is journalled on the bushing.

BRIEF DESCRIPTION OF THE DRAWINGS

FIG. 4 is a side elevation view of a second embodiment of the syspension system of this invention;

FIG. 5 is a top plan view of the suspension system of FIG. 4;

FIG. 6 is a view in section taken on the plane of the line 6—6 of FIG. 4;

FIG. 7 is an enlarged view in section taken on the plane of the line 7—7 of FIG. 4;

FIG. 8 is a side elevation view of a third embodiment of the suspension system of this invention;

FIG. 9 is a top plan view of the suspension system of FIG. 8 as viewed on the plane of the line 9—9 of FIG. 8;

FIG. 10 is an elevation view of the suspension system of FIG. 8 as viewed on the plane of the line 10—10 of FIG 8;

FIG. 11 is an end elevation view of the suspension system of FIG. 8 viewed on the plane of the line 11—11 of FIG. 8;

FIG. 12 is a view in section taken on the plane of the line 12—12 of FIG 8;

FIG. 16 is a view in section taken on the plane of the line 16—16 of FIG. 13;

FIG. 17 is a schematic view with parts broken away showing installation of the suspension systems of FIGS. 8 and 13 to tag and steer axles, respectively.

FIG. 18 is a side elevation view of a fifth embodiment of the suspension system of this invention;

FIG. 19 is a top plan view of the suspension system of FIG. 18;

FIG. 20 is a front elevation view of the suspension system of FIG. 18 as viewed from the left side of FIG. 18;

FIG. 21 is a rear elevation view of the suspension system of FIG. 18 as viewed from the right side of FIG. 18;

FIG. 22 is an enlarged view in section taken on the plane of the line 22—22 of FIG. 18;

FIG. 23 is a side elevation view of a sixth embodiment of the suspension system of this invention;

FIG. 24 is a top plan view of the suspension system of FIG. 23;

DETAILED DESCRIPTION OF THE PREFERRED EMBODIMENTS

Figure 1:
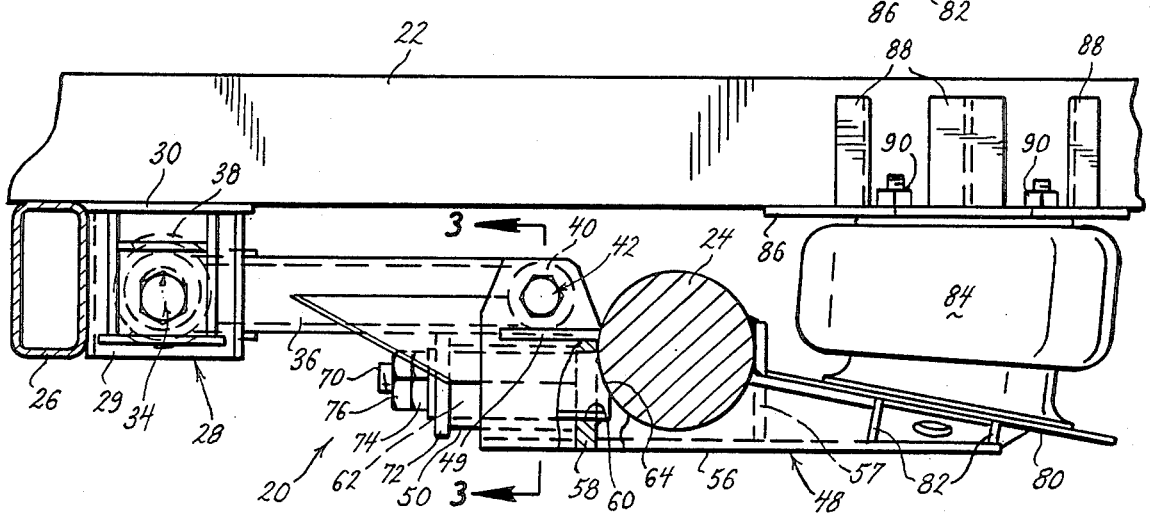
FIG. 1 is a side elevation view of a first embodiment of the suspension system.
Figure 3:
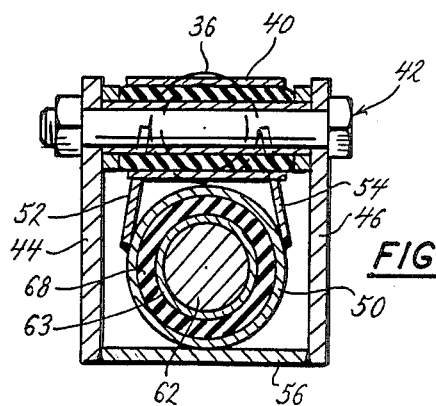
FIG. 3 is an enlarged view in section taken on the plane of the line 3—3 of FIG. 1.

FIG. 1 illustrates a suspension system 20 that is particularly designed for use with a vehicle having a chassis including a side rail 22 and a drop axle having a drop axle member 24 of large diameter. Such a vehicle is the kind typically used for a multi-axle car haul van trailer.

Figure 2:
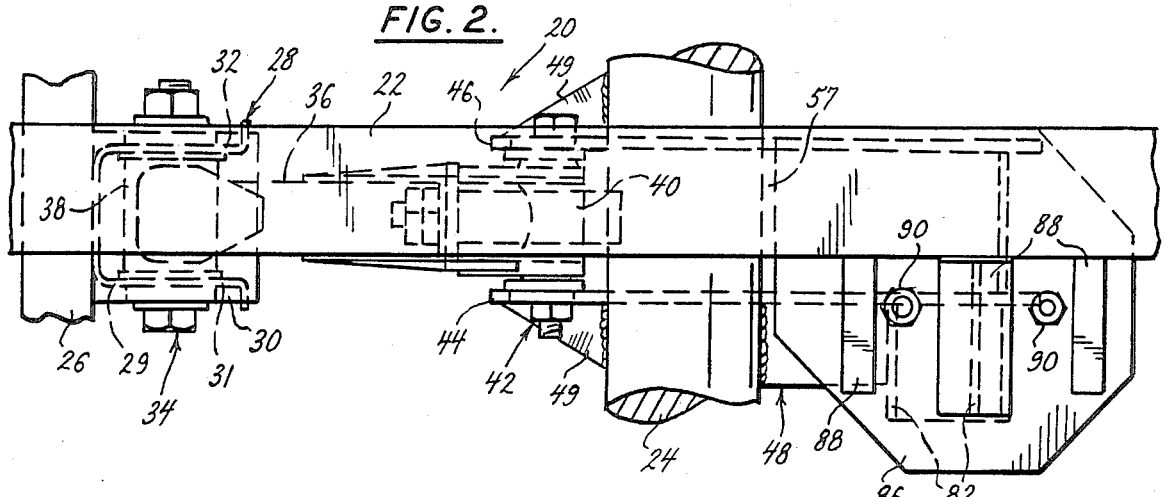
FIG. 2 is a top plan view of the suspension system of FIG. 1.

A cross member 26 extends transversely between the side rail 22 and a similar side rail on the other side of the vehicle. A hanger assembly 28 includes a vertical channel member 29 that is welded to a top plate 30, in turn welded to the bottom of the side rail 22. As shown in FIG. 2, the center line of the channel member 30 is slightly outboard of the center line of the side rail 22. The channel member 29 has spaced sides 31 and 32 that support an eccentric bolt and bushing assembly 34 between them. The eccentric bolt and bushing assembly 34 is the kind shown and described in Raidel U.S. Pat. No. 3,510,149 to provide axle adjustment (in the range of one-half inch) in the manner now known in the art.

A tubular torque rod 36 has an end 38 journalled on the eccentric bolt and bushing assembly 34. The other end 40 of the torque rod 36 is journalled on a bushing assembly 42 that is mounted between two side walls 44 and 46 of a fabricated axle seat assembly 48. Reinforcing is provided by side gussets 49 welded to the side walls 44 and 46. As appears in FIG. 2, the torque rod 36 is located directly below the side rail 72.

Positioned immediately below the torque rod 36 is a hollow sleeve 50. The sleeve 50 is joined to the torque rod by a pair of side plates 52 and 54 that are welded to the sides of both the torque rod 36 and the hollow sleeve 50.

The two side plates 44 and 46 of the axle seat assembly 48 and the reinforcing gussetts 49 are welded to the lower side of the axle 24 and to a bottom plate 56, providing an underslung installation. A cross block 57 is welded between the side plates 44 and 46 and to the rearward side of the axle 24. Another transverse block 58 is welded between the side plates 44 and 46 and to the front of the axle 24. The block 58 is thick (preferably at least one inch thick) and has a machined hole 60 through it. A pin or shaft 62 having a sleeve 63 welded to it extends through the hole 60, and is welded to the block 58. The shaft 62 has an arcuate face 64 on its rearward end that bears against the axle 24. Thus, the axle seat assembly 48 welded to the axle, the shaft 62 welded to the axle seat assembly, and the axle 24 form an integral component. An elastomeric bushing 68 fits within the space between the sleeve 63 and the outer sleeve 50 which acts as a bushing housing.

The shaft 62 has a threaded stud 70 projecting from its forward end and a compression cap 72 is mounted on the stud 70. The compression cap 72 presses a ring (not shown, but like the ring 133 described hereinafter) against the end of the resilient bushing 68. A nut 74 and a lock nut 76 are threaded onto the stud 70 to adjust the pressure of the aforesaid ring against the end of the elastomeric bushing 68 to compress the bushing 68 to the desired compression against the sleeve 63 and the bushing housing 50.

Rearward of the axle 24, the axle seat assembly 48 carries a downwardly and rearwardly inclined plate 80, strengthened by reinforcing gussets 82. An air spring 84 is connected to the plate 80. Because the plate 80 projects transversely outboard, the air spring 84 is set outboard, as shown in FIG. 2.

An upper spring seat plate 86 has brackets 88 by which it is welded to the side rail 22. The upper side of the air spring 84 is connected to the spring seat plate 86 by bolts 90.

Typically, the body of a car haul van tailer rides relatively low to the ground, which reduces clearance above the ground. It should be observed that the underslung installation of the suspension system 20, and the orientation of the axle seat 48 generally below the torque rod 36, provides a suspension system that can be installed in an area of limited vertical clearance.

For access or repair, only a wrench is required, which can be used to disconnect the eccentric bolt and bushing assembly 34 from the hanger assembly 28 and for the removal of the nuts 74 and 76. This allows the torque rod 36 to be slid free of the axle seat assembly 48.

In FIGS. 4 through 7, another suspension system 100 is illustrated. Many of the components of the suspension system 100, including the hanger assembly 28, the eccentric bolt and bushing assembly 34, the air spring 84, and the spring seat 86, are similar to those components described in connection with the suspension system 20 and they have been given like numbers and will not be re-described.

The suspension system 100 includes a torque rod assembly 102 and an axle seat assembly 104. A primary difference between the suspension system 100 compared to the suspension system 20 is that there is no transverse bushing assembly (corresponding to the bushing assembly 42 of FIG. 1) between the torque rod assembly 102 and the axle seat assembly 104. Thus, the torque rod assembly 102 includes a tubular torque rod 106. A bushing housing tube 108 is positioned below the torque rod 106, and a pair of plates 110 and 112 are welded to the sides of the torque rod 106 and the bushing housing 108, as shown in FIG. 7: A metal strap 114 may be welded to the side plates 110 and 112 and to the bottom side of the bushing housing 108.

The axle seat assembly 104 includes a pair of side plates 116 and 118 that, as shown in FIG. 4, conform to the shape of the axle 24 and are welded to the axle 24. In addition to the rearward transverse block 57, like the one already described in connection with the suspension system 20, there is a forward transverse block 120 with a machined hole 122 through it for receiving a shaft or pin 124. There is no transverse bushing assembly between the torque rod assembly 102 and the axle seat assembly 104 because the shaft 124 is larger in diameter than that of the shaft 62, and is preferably about three inches in diameter.

The shaft 124 is welded to the transverse block 120. The end 126 of the pin 124 that faces the axle 24 is inclined as shown in FIG. 4 to increase the area of contact between the shaft 124 and the axle seat 104 and to provide a greater area of contact between the axle 24 and the end 126. In addition, there is a flat bar 128 welded to the face 126 to add further contact area with the axle seat 104.

An elastomeric bushing 130 is positioned between the tubular bushing housing 108 and the shaft or pin 124. A compression cap 132 presses a ring 133 against the elastomeric bushing 130 when a bolt 134, threaded into the pin or shaft 124, is tightened.

While the suspension systems 20 and 100 of FIGS. 1 and 4 represent two embodiments that are adapted for incorporation in a low body trailer, such as one used for hauling automobiles, the embodiments for FIGS. 8 through 17, although incorporating many of the concepts of the suspension systems 20 and 100, are primarily intended for use on military vehicles where vertical clearances are greater but longitudinal clearances may be tighter.

Figure 13:
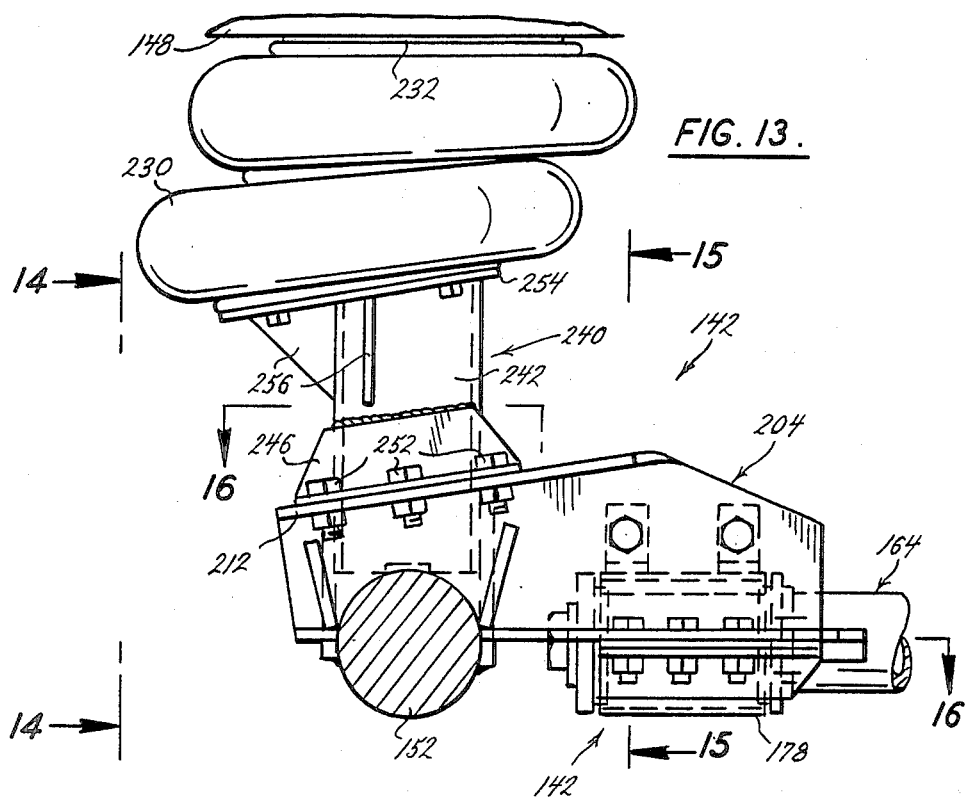
FIG. 13 is a side elevation view of a fourth embodiment of the suspension system of this invention.

First, as FIG. 17 illustrates, it should be observed that the suspension systems 140 and 142 illustrated in FIGS. 8 and 13, respectively, are intended for use on a military vehicle such as the vehicle 144 diagrammatically illustrated in FIG. 17. This vehicle 144 has a chassis typically including a rear chassis section 146 and a forward chassis section 148, and the vehicle has a rear trailing axle 150 and a front steer axle 152.

The suspension system 140 of FIG. 8 is designed to be installed in conjunction with the rear trailing axle 150. The suspension system 142 of FIG. 13, which is identical in components except for a tower that will be described hereinafter, is designed to be installed in conjunction with the front steering axle 152.

Referring to the suspension system 140 of FIGS. 8 through 12, there is a hanger assembly 154 welded to the bottom side of the step-down chassis section 145. The hanger assembly 154 includes a vertical channel member 156 having parallel sides 158 and 160 between which an eccentric bolt and bushing assembly 162 is mounted. The eccentric bolt and bushing assembly 162 is like the eccentric bolt and bushing assembly 34 previously described. A tubular torque rod 164 has an end 166 journalled on the eccentric bolt and bushing assembly 162.

Spaced from the other end 168 of the torque rod 164 is a collar 170 which, together with metal rings 172 and 174, is welded to the torque rod 164. Between the collar 170 and the end 168 of the torque rod 164, an elastomeric bushing 176 is mounted on the torque rod 164. A sleeve 178 acts as a bushing housing and surrounds the bushing 176. A tapped boss 180 is welded to the inner side of the tubular torque rod 164 adjacent the end 177, and a compression cap 182 is held in place by a bolt 184 that is threaded into the tapped boss 180. The compression cap 182 has a ring 186 to compress the bushing 176 within the area between the torque rod 164 and the bushing housing 178 when the bolt 184 is tightened.

A pair of lateral wings 187 and 188 are welded to and project outwardly from the bushing housing 178, and the wings 187 and 188 have bolt holes through them. In addition, there are clips 190 and 192 welded to the lower side of the bushing housing 178. The clips 190 and 192 have flanges 194 and 196, respectively, with bolt holes through them aligned with the bolt holes in the wings 187 and 188. Four clips 198 are welded to the upper side of the bushing housing 178. The clips 198 have upstanding flanges 200 with bolt holes through them.

An axle seat assembly 204 comprises vertical side walls 206 and 208, each having a lower outwardly projecting flange 210 and an upper flange 212 that is inclined forwardly and upwardly. The walls 206 and 208 have cutout sections 214 that are complementary in shape to and surround the upper side of the axle 150 where the side plates 206 and 208 are welded to the axle. There are also transverse plates 216 and 218 welded between the side walls 206 and 208 and also welded to the axle 150. A spring seat plate 220 is welded to the upper flanges 212 of the side members 206 and 208. The spring seat 220 is further reinforced by the gussets 216 and 218 that are welded to the underside of the spring seat plate 20 and to the axle 150.

The lower flanges 210 of the side walls 206 and 208 have bolt holes that are aligned with the bolt holes in the wings 187 and 188 and the flanges 194 and 196, enabling the axle seat assembly 204 to be connected to the bushing housing 178 by a plurality of bolts 226. Additional connections are by way of bolts 228 connecting the side walls 206 and 208 to the upstanding flanges 200 of the clips 198. Thus, a few bolts connect the axle seat assembly 204 integrally to the bushing housing 178, and the torque rod 164 is connected to the axle seat assembly 204 by way of the elastomeric bushing 176.

The lower side of an air spring 230 is joined to the spring seat plate 220. The upper side of the air spring 230 is connected by way of an upper plate 232 to the chassis section 144.

The suspension system 142 illustrated in FIG. 13 is identical to the suspension system 140 of FIG. 8 and incorporates all of the same components except for the addition of a tower assembly 240 between the axle seat assembly 204 and the air spring 230. Thus, these identical components are marked with the same numbers as in the suspension system 140 of FIG. 8 and will not be redescribed.

The suspension system 142 adapts for installation with a front steer axle 152 as shown in FIG. 17 and the presence of the tower assembly 240 allows clearance of the wheel and tire under the frame of the vehicle 144 as the front wheels are turned.

Figure 14:
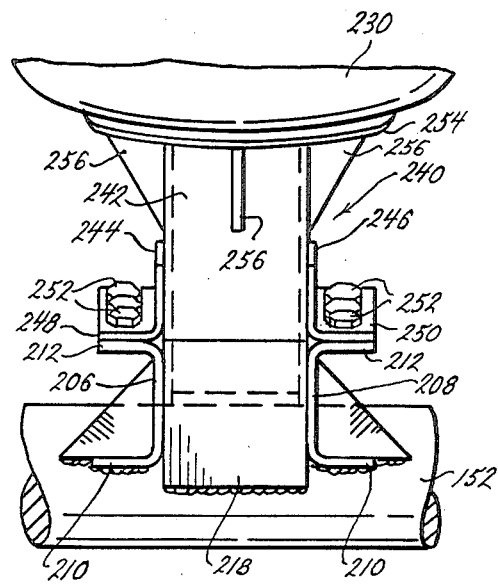
FIG. 14 is an end elevation view of the suspension system of FIG. 13 taken on the plane of the line 14—14 of FIG. 13.

The tower assembly 240 comprises a vertically oriented square tubing 242 that extends downwardly between and is welded to a pair of angle members 244 and 246. The angle members 244 and 246 have outwardly extending inclined flanges 248 and 250, respectively, with bolt holes through them for receiving a plurality of bolts 252 by which the tower assembly 240 is bolted to the upper flanges 212 of the side members 206 and 208, as shown in FIGS. 13 and 14.

The tower assembly 240 includes an upper spring seat plate 254 welded to the top of the vertical square tubing 242 and oriented generally parallel to the flanges 212. The plate 254 is reinforced by gussets 256 that are welded in place. As shown in FIG. 13, the lower end of the air spring 230 is connected to the plate 254 and the upper end is connected by way of the plate 232 to the chassis section 148. As FIG. 17 illustrates, a hanger section 154 identical to the hanger section described in connection with FIG. 8 is joined to the chassis section 149, and the torque rod 164 of the suspension system 142 is journalled on an eccentric bolt and bushing assembly 162 that is mounted on the hanger 154.

FIGS. 18 through 22, which show a fifth embodiment of the invention, illustrate a suspension system 260 for use on a vehicle that has a chassis including a left rail member 262 and a rectangular drive axle 264. This vehicle is another one that has limited vertical space, such as would be the case of a multi-car van haul trailer.

A hanger assembly 266 depends downwardly from the frame rail member 262. The hanger 266 is in the form of a vertical channel member that has side walls 268 and 270 between which an eccentric bolt and bushing assembly 272 is mounted. The eccentric bolt and bushing assembly 272 is like the eccentric bolt and bushing assemblies incorporated on the previous embodiments.

The front end 274 of a torque rod 276 is journalled on the bushing assembly 272. The torque rod 276 terminates in and forms part of a bushing assembly 278 that may be like those shown in FIGS. 8 through 17 in that the torque rod 276 functions as an inner bushing cylinder 280, that is surrounded by an elastomeric bushing 282, and an outer sleeve 284 acts as a bushing housing and surrounds the elastomeric bushing 282. Similarly, a compression collar 284 is held in place and can be tightened by a bolt 286 to adjust the compressive force of the bushing 282.

Figure 15:
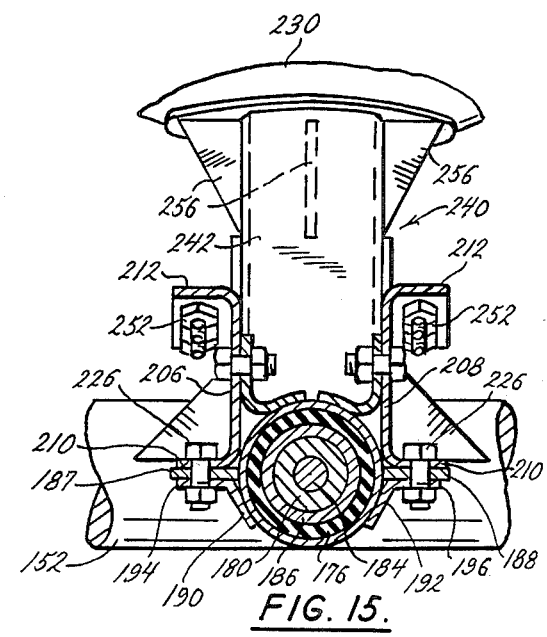
FIG. 15 is a view in section taken on the plane of the line 15—15 of FIG. 13.
Figure 25:
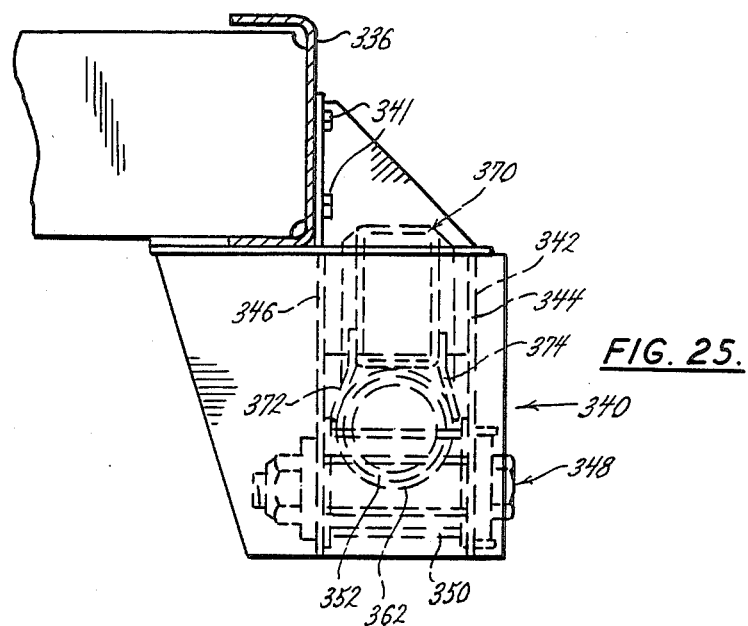
FIG. 25 is a front elevation view of the suspension system of FIG. 23 as viewed from the left side of FIG. 23.
Figure 26:
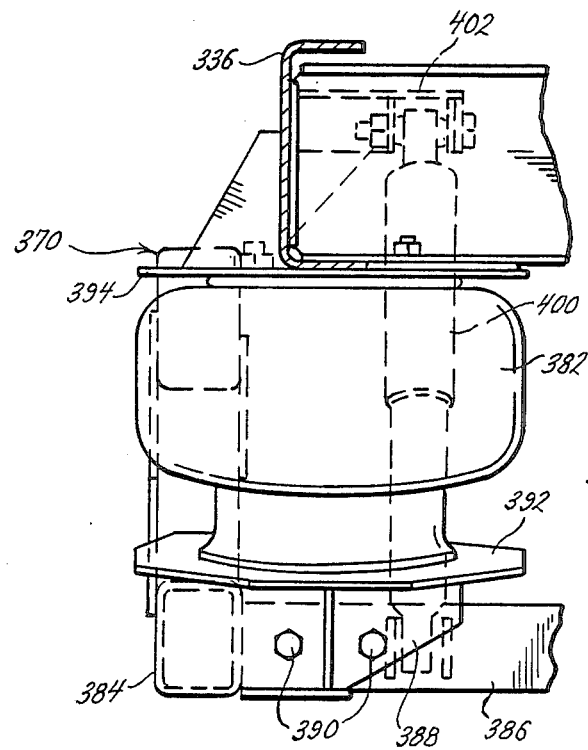
FIG. 26 is a rear elevation view of the suspension system of FIG. 23 as viewed from the right side of FIG. 23.

As with the embodiment shown in FIG. 15, the bushing assembly 278 incorporates lateral wings 288 and 290 welded to the bushing housing 284 and clips 292 and 294 welded to the lower sides of the bushing housing 284. There are aligned bolt holes through the wings 288 and 290 and the clips 292 and 294. A pair of vertical braces 292 and 294 extend transversely of and are welded to the top of the bushing housing 284, as particularly shown in FIG. 22. The braces 292 and 294 have vertical side wings 296 with bolt holes through them.

The axle seat assembly 300 is formed as an inverted channel member having a top wall 302 and side walls 304 and 306 that terminate in outer flanges 308 and 310 having bolt holes through them. As shown in FIGS. 18 and 22, the flanges 308 and 310 allow the axle seat assembly 300 to be connected to the wings 288 and 290 by bolts 312. Beyond the bushing assembly 278, a reinforcing plate 314 is welded to the bottoms of the flanges 308 and 310. The plate 314 has a cutaway section 316 to allow access to the bolt 286 (see FIG. 19).

The axle seat assembly 300 extends across and has cutout sections to accommodate the axle 264. Lateral flanges 316 and 318 accommodate U-bolts 320 by which the axle seat assembly 300 is connected to the axle 264.

At its rearward end, the axle seat assembly 300 has a step-down section 322 having an upper plate 324 welded to it and reinforced by appropriate gussets 326. An upper spring seat 328 is connected to the frame rail member 262. An air spring 330 is mounted between the spring seat 328 and the plate 324.

A suspension system 334 represents a sixth embodiment of the invention and is shown in FIGS. 23-26. The suspension system 334 is adapted for installation on a vehicle having a chassis with a side rail 336 and, in the embodiment illustrated, a square axle 338.

A hanger assembly 340 is connected to the side rail 336, such as by a plurality of bolts 341. The hanger assembly includes a vertical channel member 342 that has spaced side plates 344 and 346 with various reinforcing plates as shown that displace the channel member 342 laterally outboard of the side rail 336 (see FIG. 25).

An eccentric bolt and bushing assembly 348 is mounted between the side plates 344 and 346. The eccentric bolt and bushing assembly 348 includes an outer sleeve 350. A tubular torque rod 352 is welded to the upper side of the bushing sleeve 350. A pin or shaft 354 has a chamfered end 356 and is welded to the tubular torque rod 352. The shaft 354 may be further held in place by a pin 358 that extends through the shaft 354 and the side walls of the tubular torque rod 352.

A collar 360 is welded to the shaft 354, and an outer sleeve 362 bears against the collar 360. A resilient bushing 364 is positioned between the shaft 354 and the outer sleeve 362. A compression cap 366 is tightened in place by a bolt 368 threaded into the shaft 354. The compression cap 366 allows setting of the compression of the bushing 364 and also prevents removal of the outer sleeve 362.

An axle seat 370 in the form of a square tube overlies the torque beam assembly 351. A pair of plates 372 and 374 are welded to the axle seat 370 and to the outer bushing sleeve 362. The axle seat 370 includes a pair of lateral wings 376 and 378 that allow the axle seat to be connected to the axle 338 by a pair of U-bolts 380. Since the axle seat 370 is laterally outboard of the rail member 336, it can be overslung relative to the axle 338 and can be above the torque beam assembly 351 without interference between the axle seat 370 and the side rail 336.

Nevertheless, the design of the axle seat 370 allows an air spring 382 to be located directly below the side rail 336. This is accomplished by a step-down section 384 immediately rearward of the axle 338. A transversely extending bolster beam 386 is connected to the step-down section 384 of the axle seat 370 and to a like axle seat on the other side of the vehicle.

A frame 388 is welded to the axle seat step-down section 384 and is connected to the bolster beam 386 by bolts 390. The frame 388 supports a lower spring seat 392 to which the lower side of the air spring 382 is connected. The upper side of the air spring 382 is connected to an upper spring seat 394 that is welded to the side rail 336.

A stub beam in the form of a channel 396 extends inboard from the step-down section 384. The frame 388 includes plates 398 that are welded to the stub beam 396. The lower end of a shock absorber 400 is bolted to the stub beam 396. The upper end of the shock absorber 400 is bolted to a bracket 402 that is connected to the side rail 336.

INSTALLATION AND OPERATION

It will be observed that the suspension systems that have been described can be easily installed and disassembled for access to vehicle components or for repair. For example, in these suspension systems, the torque rod can be disconnected from the axle seat assembly with only a wrench.

Referring to the suspension system 20 of FIG. 1, a universal pivot is provided by the eccentric bolt and bushing assembly 32 about a transverse axis and by the bushing 68 about a longitudinal axis. Additional pivotal flexibility is provided by the bushing assembly 42.

The suspension system 100 of FIG. 4 eliminates a bushing assembly like the bushing assembly 42 of FIG. 1. This allows a larger pin or shaft 124 to be incorporated in the bushing connection between the axle seat assembly 104 and the torque rod assembly 102. In the suspension system 100, the universal pivot movement is provided in a transverse direction about the bushing assembly 34 and in a longitudinal direction about the bushing 130.

The suspension systems 140 and 142 are designed for installation on a short vehicle such as a military vehicle. The universal pivotal movement is provided by a bushing assembly 162 at the hanger and by a bushing 176 in the connection between the torque rod assembly and the axle seat assembly 204. In the suspension system 140, the air spring 230 is connected to the axle seat assembly 204. In the suspension system 142, the tower is connected to the axle seat assembly 204 and the air spring 230 is connected to the tower 240. The tower thus transforms the suspension system 140 from a tag axle suspension system to a suspension system 142 suitable for connection to a steer axle.

In the suspension systems 260, and 334, the axle seat is overslung. The suspension system 260 is designed to allow the axle seat 300 to be located directly below the side rail 262. The suspension system 334 has a heavy duty axle seat 370 and the hanger is designed to locate the axle seat 370 outboard of the side rail 336. Yet the structure allows the air spring 382 to be located directly below the side rail 336.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. A suspension system for a vehicle having a chassis and an axle, comprising a hanger supported from the vehicle chassis, a torque beam having forward and rearward ends, a first bushing assembly for connecting the forward end of the torque beam to the hanger and allowing swinging movement of the torque beam about an axis transverse to the chassis while restricting it to a generally vertical plane, an axis seat having a forward end and a rearward end, means for joining the axle seat to the axle, an air spring mounted between the axle seat and the chassis, and a second bushing assembly spaced longitudinally from the first bushing assembly for connecting the forward end of the axle seat to the rearward end of the torque beam and allowing relative rocking movement of the torque beam and axle seat about a generally longitudinal axis, whereby the first and second bushing assemblies cooperate to permit universal movement of the axle while the second bushing assembly also serves as a connecting means between the torque beam and the axle seat.

2. The suspension system of claim 1 wherein the means for joining the axle seat to the axle is intermediate the ends of the axle seat.

3. The suspension system of claim 2 wherein the air spring is at the rearward end of the axle seat and the axle is between the air spring and the forward end of the axle seat.

4. The suspension system of claim 1 wherein the means for joining the axle seat to the axle is at the rearward end of the axle seat.

5. The suspension system of claim 4 wherein the air spring is directly above the axle.

6. The suspension system of claim 1 wherein the first bushing assembly includes an eccentric bolt for aligning the axle.

7. The suspension system of claim 1 including a third bushing assembly supported by the torque arm on an axis transverse thereto, the axle seat being journalled on the third bushing assembly.

8. The suspension system of claim 1 wherein the axis of the axle and the axis of the torque rod are substantially intersecting.

9. The suspension system of claim 1 including a tower for mounting between the axle seat and the air spring to adapt the suspension to the clearance requirements of a steer axle.

10. A suspension system for a vehicle having a chassis and an axle, comprising a hanger supported from the vehicle chassis, a torque beam having forward and rearward ends, a first bushing assembly for connecting the forward end of the torque beam to the hanger and allowing swinging movement of the torque beam while restricting it to a generally vertical plane, an axle seat having a forward end and a rearward end, means for joining the axle seat to the axle, an air spring mounted between the axle seat and the chassis, and a second bushing assembly for connecting the forward end of the axle seat to the rearward end of the torque beam and relative rocking movement of the torque beam and axle seat about a generally longitudinal axis, the second bushing assembly including a bushing within a sleeve and a compression cap for pressing the bushing.

11. The suspension system of claim 10 including a pin welded to the axle seat, the sleeve being fixed to the torque rod and being coaxial about the pin, the bushing being between the sleeve and the pin.

12. The suspension system of claim 11 wherein the sleeve is below the torque rod.

13. The suspension system of claim 12 including plates welded to the lateral sides of the torque rod and the sleeve.

14. The suspension system of claim 11 wherein the axis of the pin is below the axis of the axle, the pin having a face adjacent the axle, the face being inclined to the axis of the pin to increase the contact area between the pin and the axle seat.

15. The suspension system of claim 14 including a bar welded between said face and to the axle seats.

16. The suspension system of claim 11 wherein the axis of the pin is below the axis of the axle, the pin having a face adjacent the axle, at least a portion of the face having a concave surface complementary to the portion of the axle adjacent thereto.

17. A suspension system for a vehicle having a chassis and an axle, comprising a hanger supported from the vehicle chassis, a torque beam having forward and rearward ends, a first bushing assembly for connecting the forward end of the torque beam to the hanger and allowing swinging movement of the torque beam while restricting it to a generally vertical plane, an axle seat having a forward end and a rearward end, means for joining the axle seat to the axle, an air spring mounted between the axle seat and the chassis, and a second bushing assembly for connecting the forward end of the axle seat to the rearward end of the torque beam and allowing relative rocking movement of the torque beam and axle seat about a generally longitudinal axis, the axis of the axle and the axis of the torque rod substantially intersecting, the axle seat being overslung relative to the axle, the hanger extending outboard of the chassis and positioning the torque beam and axle seat outboard of the chassis, the chassis including a side rail and the axle seat having a stepdown section rearward of the axle, a transverse bolster beam connected between the stepdown section and a like step-down section on the opposite side of the vehicle, and a lower spring seat supported by the bolster beam to locate the air spring directly below the side rail.

18. A suspension system for a vehicle having a chassis and an axle below the chassis, comprising a hanger, a torque rod, a first bushing assembly supported by the hanger, the torque rod being mounted on the bushing assembly for rocking movement about a transverse axis, an axle seat, a second bushing assembly spaced longitudinally from the first bushing assembly for supporting the axle seat from the torque rod and allowing rocking movement of the axle seat relative to the torque rod about a longitudinal axis, an air spring mounted between the axle seat and the chassis, the second bushing assembly including a shaft and a sleeve coaxial with one another, one of which is fixed to the torque rod and the other of which is fixed to the axle seat and including an elastomeric member between the shaft and the sleeve.

19. The suspension system of claim 18 including a tower connectable between the axle seat and the air spring to increase the clearance between the chassis and the axle.

20. The suspension system of claim 18 including a pressure cap for compressing the elastomeric member.

21. The suspension system of claim 18 wherein the axle seat has a connection face, the air spring having an upper side connectable to the chassis and a lower side mountable to the connection face, and a tower having a lower side mountable to the connection face and having an upper side mountable to said air spring side for selective connection of the tower between the axle seat and the lower side of the spring.

22. The suspension system of claim 18 wherein the shaft is an extension of the torque rod and the axle seat includes a body and a bracket, the bracket being welded to one side of the sleeve, means to connect the bracket to the body, and pressure plate means connected to the body for bearing against another side of the sleeve opposite said one side when the bracket is connected to the body.

23. The suspension system of claim 18 wherein the axle seat is mounted to the axle in overslung fashion and includes a step-down section rearward of the axle, the air spring being mounted between the step-down section and the chassis.

24. The suspension system of claim 18 wherein the axle seat comprises a fabricated plate assembly, means for rigidly connecting the shaft to the plate assembly, and a pair of plates welded to the torque beam and to the sleeve for rigidly connecting the sleeve to the torque beam.

25. The suspension system of claim 18 wherein the axle seat comprises a fabricated plate assembly and including wings affixed to the sleeve and projecting laterally therefrom, the axle seat incorporating laterally projecting flanges, and means for joining the flanges to the wings to connect the sleeve to the axle seat.

26. The suspension system of claim 25 including a plurality of clips welded to the sleeve and projecting generally upward, the axle seat incorporating vertical side panels, and means for connecting the side panels to the clips.

* * * * *